(12) United States Patent
Ghiggino et al.

(10) Patent No.: US 8,666,250 B2
(45) Date of Patent: Mar. 4, 2014

(54) OPTICAL ACCESS NETWORK AND NODES

(75) Inventors: Pierpaolo Ghiggino, Leamington Spa (GB); Fabio Cavaliere, Vecchiano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 339 days.

(21) Appl. No.: 12/921,370

(22) PCT Filed: May 27, 2008

(86) PCT No.: PCT/EP2008/056474
§ 371 (c)(1),
(2), (4) Date: Nov. 26, 2010

(87) PCT Pub. No.: WO2009/112083
PCT Pub. Date: Sep. 17, 2009

(65) Prior Publication Data
US 2011/0076018 A1 Mar. 31, 2011

(30) Foreign Application Priority Data
Mar. 11, 2008 (EP) .................................... 08152590

(51) Int. Cl.
*H04J 4/00* (2006.01)
*H04J 14/00* (2006.01)
*H04B 10/00* (2013.01)

(52) U.S. Cl.
USPC .................. 398/76; 398/43; 398/67; 398/153

(58) Field of Classification Search
USPC ........................... 398/43, 66, 67, 76, 140, 153
See application file for complete search history.

(56) References Cited

U.S. PATENT DOCUMENTS

| 5,420,861 | A | 5/1995 | De La Bourdonnaye | |
|---|---|---|---|---|
| 5,710,648 | A * | 1/1998 | Frigo | 398/108 |
| 6,288,809 | B1 * | 9/2001 | Touma et al. | 398/9 |
| 6,785,242 | B2 * | 8/2004 | Darcie et al. | 370/248 |
| 2004/0022536 | A1 * | 2/2004 | Koh et al. | 398/41 |
| 2004/0264492 | A1 * | 12/2004 | Blahut et al. | 370/442 |
| 2006/0115271 | A1 | 6/2006 | Hwang et al. | |
| 2009/0129773 | A1 * | 5/2009 | Oron | 398/10 |

FOREIGN PATENT DOCUMENTS

WO 03/081825 A 10/2003

OTHER PUBLICATIONS

PCT International Search Report, mailed Feb. 10, 2009, in connection with International Application No. PCT/EP2008/056474.
Dayou, Qian et al. "10-Gb/s OFDMA-PON for Delivery of Hetereogeneous Services" Optical Fiber Communication/National Fiber Optic Engineers Conference, 2008, IEEE, Piscataway, NJ, USA, Feb. 24, 2008, pp. 1-2, XP031257294 ISBN: 978-1-55752-856-8.

(Continued)

*Primary Examiner* — Leslie Pascal
*Assistant Examiner* — Casey Kretzer
(74) *Attorney, Agent, or Firm* — Potomac Patent Group PLLC (57) ABSTRACT

An optical network terminal (ONT) for use in an optical access network and comprising: an optical transceiver arranged to communicate with an optical line terminal using a wavelength which is modulated to carry sub-channels; a second transceiver arranged to communicate with a number of subscriber equipment using respective subscriber equipment channels; the ONT arranged to automatically map each subscriber equipment channel to a respective sub-channel of the wavelength without using an address associated with the respective subscriber equipment.

22 Claims, 9 Drawing Sheets

(56) References Cited

OTHER PUBLICATIONS

Wei, Wei et al. "MAC Protocols for Optical Orthogonal Frequency Division Multiple Access (OFDMA)-based Passive Optical Networks" Optical Fiber Communication/National Fiber Optic Engineers Conference, 2008, IEEE, Piscataway, NE, USA. Feb. 24, 2008, pp. 1-3, XP031256830 ISBN: 978-1-55752-856-8.

Arshad, Chowdhury et al. "A Self-Survivable WDM-PON Architecture with Centralized Wavelength Monitoring, Protection and Restoration for both Upstream and Downstream Links" Optical Fiber Communication/National Fiber Optic Engineers Conference, 2008. IEEE, Piscataway, NJ, USA. Feb. 24, 2008, pp. 1-3, XP031256720 ISBN: 978-1-55752-856-8.

EP Article 94(3) Communication, mailed Apr. 4, 2013, in connection with European Patent Application No. 08 760 072.2-1860 (all pages).

Hui, Rongqing et al. "Subcarrier Multiplexing for High-Speed Optical Transmission" Journal of Lightwave Technology, IEEE Service Center, New York, NY, US, vol. 20, No. 3, pp. 417-427, Mar. 1, 2002, XP011030141, ISSN: 0733-8724.

* cited by examiner

OPTICAL ACCESS NETWORK AND NODES

CROSS-REFERENCE TO RELATED APPLICATIONS

This application claims priority under 35 U.S.C. §119 to European Patent Application No. 08152590.9, filed Mar. 11, 2008, which is hereby incorporated herein by reference in its entirety

FIELD OF THE INVENTION

The present invention relates to Optical Access Networks such as Passive Optical Networks (PON), and nodes used within these networks such as Optical Network Terminals (ONT) and subscriber equipment.

BACKGROUND OF THE INVENTION

Passive Optical Networks (PON) are point-to-multipoint optical fibre based access networks. Traditionally, one or more preliminary optical fibres extend from an optical line terminal (OLT) which is coupled to a core or backhaul network. The optical fibre or fibres terminate at a power splitter from which further optical fibres extend. These further or secondary optical fibres may in turn terminate at further power splitters with tertiary optical fibres extending from these splitters and so on. In this way, a number of subscriber equipment may be coupled to the OLT by this network of optical fibres and splitters. Because the primary fibre or fibres adjacent the OLT are common to all of the subscriber equipment, this bandwidth resource must be shared. Thus each subscriber equipment can only be allocated a small part of this shared bandwidth resource.

This natural limitation of the architecture of PONs limits the cost effectiveness of extending the fibre all the way to a subscriber's home. This is because the cost of installing a high bandwidth optical fibre to carry a small part of the shared bandwidth is too high. Therefore the fibre of a PON typically terminates at a street cabinet to be shared by a number of subscriber equipment. The street cabinet houses an optical network terminal (ONT). The last few meters or kilometer from the street cabinet to a subscribers home is typically bridged using existing twisted pair copper cables or radio links. The bandwidth resources of the fibre to the street cabinet are typically shared amongst a group of subscribers using an Ethernet switch. Whilst the downstream channels of a PON are broadcast to each ONT, an upstream channel is provided for each ONT on the PON using a time division multiple access (TDMA) protocol.

The use of 10 Gb/s transmission in PON is under study to better exploit the potential fibre capacity and provide greater bandwidth to each subscriber equipment. Similarly, the use of wave division multiplexing (WDM) techniques is also under study for the same purpose. However, the challenge in access networks is to maintain a low overall cost. This enhanced capacity may enhance the extent of fibre penetration when considering the implementation, extension and/or optimisation of an existing PON. For example the fibre may extend to a street cabinet, a kerb outside a subscribers home, or directly into the subscribers home itself.

SUMMARY OF THE INVENTION

In one aspect the present invention provides an Optical Network Terminal (ONT) for use in an optical access network such as a Passive Optical Network (PON) and which comprises an optical transceiver communicating with an Optical Line Terminal (OLT) using a wavelength which is modulated to carry sub-channels. The sub-channels may be provided using Time Division Multiplexing (TDM) or Sub-Carrier Multiplexing (SCM) for example. The ONT also comprises a second transceiver for communicating with a number of subscriber equipment using respective subscriber equipment channels. The ONT is arranged to automatically map each subscriber equipment channel to a respective sub-channel of the wavelength without using an address associated with the respective subscriber equipment.

The ONT may be used in a WDM or single wavelength PON, and may be coupled to the OLT using a wavelength or power splitter. The ONT may be coupled to the subscriber equipment using optical fibre, radio or copper links.

By utilising sub-channels the optical access network is able to service additional subscribers and therefore enhance the utilisation of the optical fibres. At the same time, using an ONT which is arranged to automatically map subscriber equipment channels to respective sub-channels, the cost of this additional network capacity is minimised. Thus, unlike ONT in existing systems, there is no need to allocate subscriber equipment channels amongst the subscriber equipment depending upon demand. Instead a cost effective simple static routing solution allows for increasing the capacity of a new or existing optical access network at low cost.

The present invention also provides an optical access network having an OLT coupled to an ONT as defined above, which in turn is coupled to a number of subscriber equipment, wherein subscriber equipment channels for respective subscriber equipment is automatically mapped to respective sub-channels of a wavelength for use between the OLT and ONT, and without using an address associated with the respective subscriber equipment.

This arrangement may be implemented in a single wavelength or WDM PON. The subscriber equipment may comprise secondary ONT coupled to the first ONT using optical fibres.

The present invention also provides subscriber equipment adapted to communicate with an Optical Network Terminal as defined above, and as defined in the appended claims.

Similarly the invention also provides methods of operating the ONT, optical access network and subscriber equipment.

BRIEF DESCRIPTION OF THE DRAWINGS

Embodiments will now be described with reference to the following drawings, by way of an example only and without intending to be limiting, in which.

DESCRIPTION OF THE EMBODIMENTS

Figure 1:
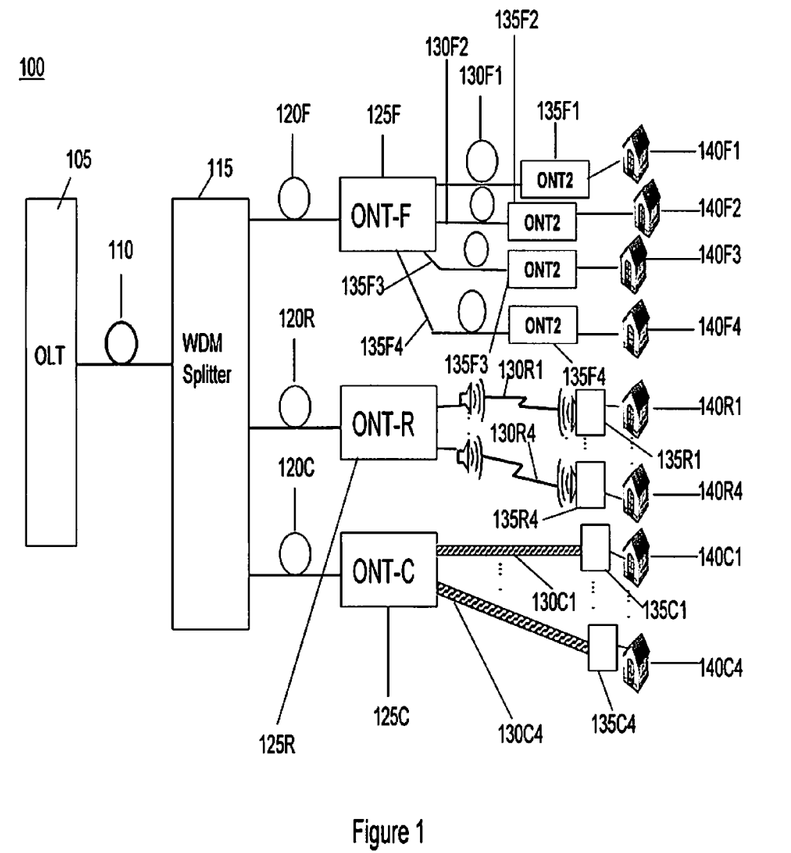
FIG. 1 shows a Passive Optical Network according to an embodiment.

Referring to FIG. 1 a Passive Optical Network (PON) 100 is shown and which comprises an Optical Line Terminal (OLT) 105 coupled by an optical fibre 110 to a Wavelength Division Multiplex (WDM) splitter 115, and a number of Optical Network Terminals (ONT) 125F, 125R and 125C coupled to the WDM splitter using respective optical fibres 120E-120C. Each ONT 125F-C is coupled to a number of subscriber equipment 135F1-135F4, 135R1-135R2, and 135C1-135C2 respectively. These subscriber equipment may be coupled to their respective ONT using optical fibres 130F1-130F4, radio links 130R1-130R4, or copper cable 130C1-130C4. Each subscriber equipment may be installed within a respective subscribers premises 140F1-140C4 to service a number of communications appliances such as telephones, computers, or televisions. Alternatively one or more of the subscriber equipment may support communications appliances in a number of subscriber's premises.

It can be seen that, compared with known PON arrangements, an additional type of splitting is introduced by the use of a primary ONT 125F servicing a number of secondary ONT 135F1-4.

Figure 2:
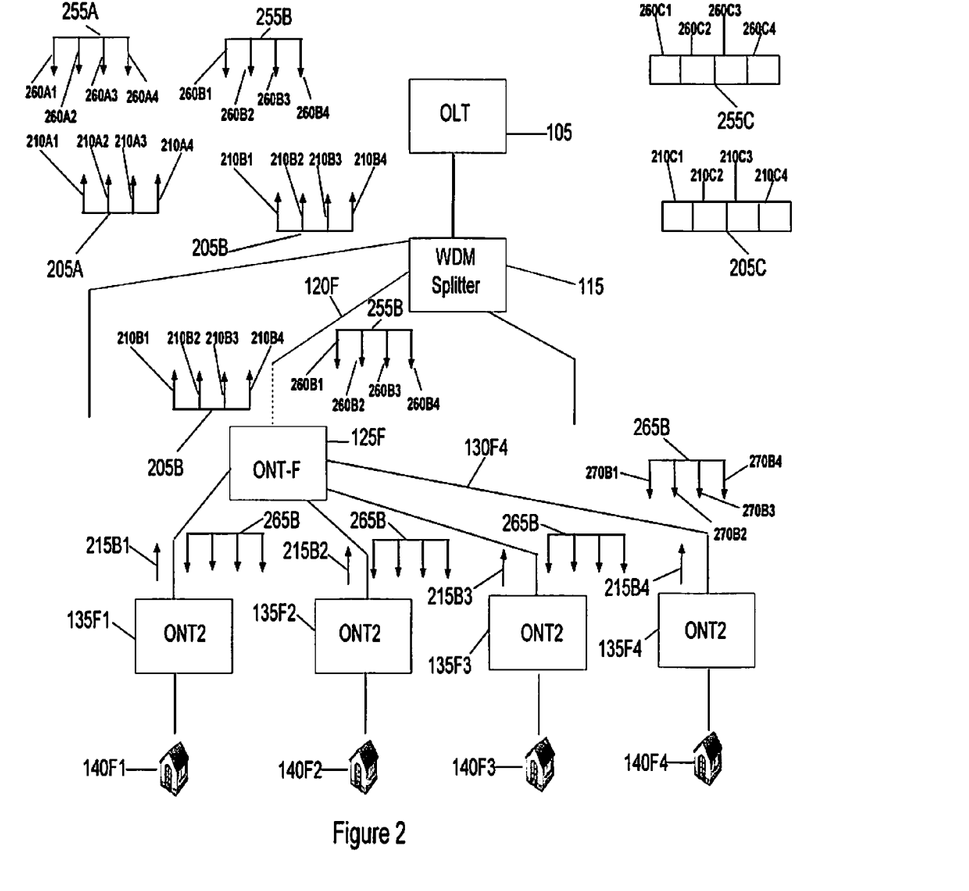
FIG. 2 illustrates sub-channels and subscriber equipment channels used in the PON of FIG. 1 and according to an embodiment.

FIG. 2 partially illustrates the use of sub-channels and subscriber equipment channels according to an embodiment, and as can be used in the PON of FIG. 1. Downlink channels are shown as arrows pointing downwards on the page, and uplink channels are shown as arrows pointing upwards on the page. Typically downlink and uplink channels are provided on different wavelengths. For simplicity of explanation, only three uplink wavelengths 205A, 205B, and 205C are shown together with only three downlinks wavelengths 255A, 255B and 255C between the OLT 105 and the WDM splitter 115. However it will be appreciated that any number of upstream or downstream wavelengths may be employed to service respective ONT. Similarly, each upstream or downstream wavelength is shown having only four sub-channels. Again, any number of sub-channels may be used on a wavelength, and these may vary between wavelengths. The upstream sub-channels include 210B1-4 carried by upstream wavelength 205B, and the downstream sub-channels include 260B1-4 carried by downstream wavelength 255B.

The downstream wavelengths 255A-C are split at the WMD splitter 115 onto respective fibre 120E-C for onward transmission to their respective ONT 125F-C. Similarly upstream wavelengths 205A-B are aggregated at the WDM splitter from their respective ONT for onward transmission to the OLT 105 as would be appreciated by those skilled in the art. In the figure, only one ONT 125F is shown for simplicity. The ONT 125F receives the downstream wavelength 255B including all sub-channels 260B1-4 and broadcasts these sub-channels as downlink or downstream subscriber equipment channels 270B1-4 to each of the subscriber equipment 135F1-4 coupled to it. This may be implemented using an optical power splitter in an all optical transmission path through the ONT. Thus in this embodiment, the split down link sub-channels 260B 1-4 form the down link subscriber equipment channels 270B1-4 carried by the split wavelength 265B. For clarity, only one group of these down link subscriber equipment channels has been labeled, however the other three groups of channels are equivalent and will typically be power split equally.

In an alternative embodiment, the down link sub-channels 260B1-4 may be mapped by the ONT 125F onto respective optical fibres 135F1-4 such that they are not broadcast to each subscriber equipment 135F1-4. Instead these sub-channels may be mapped onto individual down link subscriber equipment channels for reception only by their respective subscriber equipment 135F1-4.

The respective subscriber equipment 135F1-4 transmit respective up link subscriber equipment channel 215B1-4 to the ONT 125F along their respective optical fibres 130F1-4. The ONT 125F maps these uplink subscriber equipment channels 215B1-4 onto uplink sub-channels 210B1-4 which are transmitted to the OLT 105. The mapping by the ONT 125F between the up link subscriber equipment channels 215B1-4 and respective up link sub-channels 210B1-4 is static. Thus for example up link subscriber equipment channel 215B1 is always mapped to up link sub-channel 210B1 on wavelength 205B. The distinction or division between the various subscriber equipment channels 215B1-4 and 270B 1-4 and also between the sub-channels 210B1-4 and 260B 1-4 may be by frequency (FDM or SCM) or time slots (TDM). The division between the sub-channels and the subscriber equipment channels may be the same or different depending on the embodiment of the ONT 125F used. In the figure, for example, sub-channels 260C1-4 and 210C1-4 are shown as time divided on wavelengths 255C and 205C respectively; however the remaining sub-channels and subscriber equipment channels are shown as being frequency divided.

In this embodiment, the down link sub-channels 260B1-4 are also statically mapped to the down link subscriber equipment channels 270B1-4 by the ONT 125F. This static mapping of up link channels and in this embodiment down links channels means that there is no need for the ONT 125F to utilise an address associated with the subscriber equipment 135F1-4. This compares with known arrangements in which an ONT would typically incorporate an Ethernet switch for switching packets from subscriber equipment onto an up link channel from the ONT to an OLT. The use of one up link sub-channel for each subscriber equipment 135F1-4 increases the capacity or bandwidth of the PON for that subscriber equipment. Similarly the use of simple static mapping at the ONT 125F allows a simple cost effective node to be added or used in order to facilitate this additional subscriber equipment capacity.

Whilst the PON 100 has been shown comprising subscriber equipment 135F1-135C4 coupled to respective ONT 125F-125C using optical fibre, radio and copper links, the connection between the ONT and their respective subscriber equipment may be all optical, all radio, all copper or a combination of these.

Figure 3:
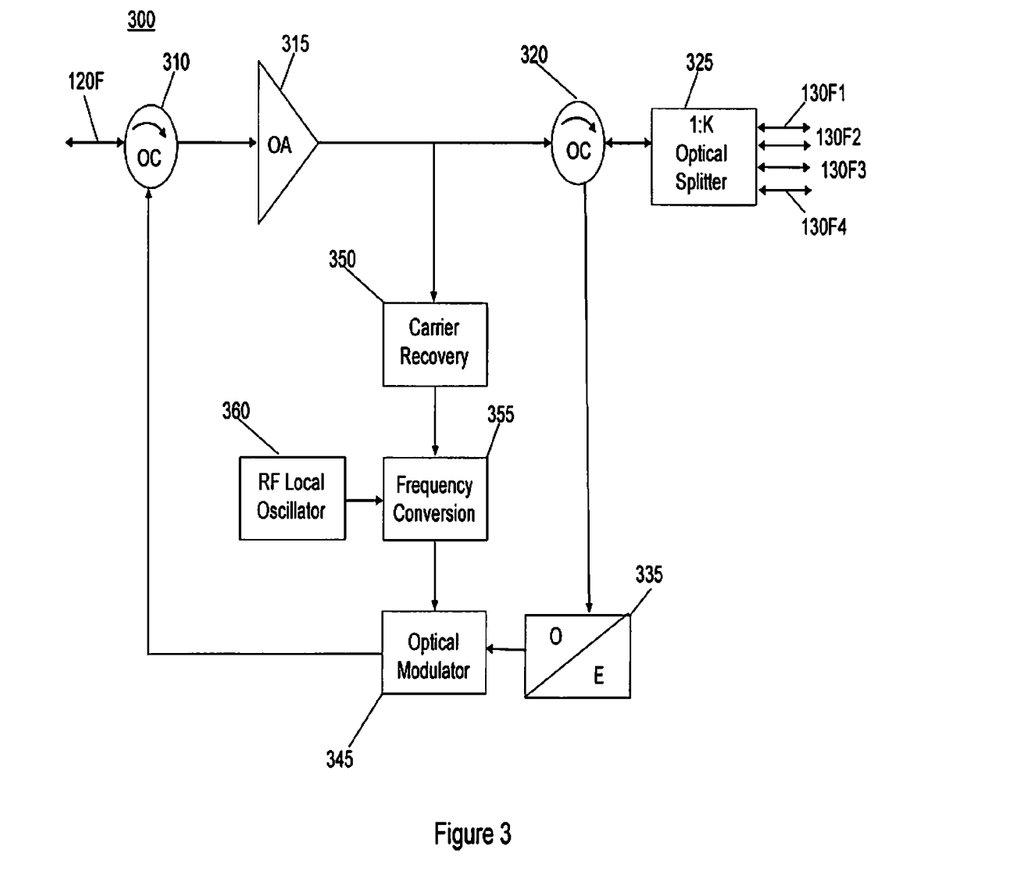
FIG. 3 shows an Optical Network Terminal according to an embodiment.

Referring to FIG. 3, an ONT according to one embodiment is shown in more detail. The ONT 300 comprises an optical circulator 310 connected to the optical fibre 120F for coupling to the WDM splitter 115 or directly to the OLT 105; an optical amplifier 315 having an input coupled to the first optical circulator 310, and an output coupled to a second optical circulator 320; an optical splitter 325 coupled to the second optical circulator 320 and which is also coupled to an optical-to-electrical interface 335. The optical splitter 325 is connected to a number of optical fibres 130F1-4 for coupling to respective subscriber equipment. The ONT also comprises an optical modulator 345 having a number of inputs from the optical-to-electrical interface 335, and an output coupled to the first optical circulator 310. The ONT also comprises a carrier recovery circuit 350 coupled to a frequency conversion circuit 355 which also receives an input from a radio frequency (RF) local oscillator 360, the frequency conversion circuit 355 having an output coupled to an input of the optical modulator 345.

The optical splitter 325 is a standard optical power splitter which splits the power of an optical signal received from the optical amplifier 315, and ultimately from the OLT 105. Thus a down stream wavelength 255B carrying sub-channels 260B1-4 is split onto each down stream optical fibre 130F1-4 as downstream subscriber equipment channels 270B 1-4 for onward transmission to the respective subscriber equipment. The optical splitter 325 also aggregates upstream subscriber equipment channels 215B1-4 which will typically be on different wavelengths, and which are forwarded to the optical-to-electrical interface 335. These separate upstream subscriber equipment channels 135F1-4 are converted into electronic signals as is known, and forwarded as electrical signals to the optical modulator 345. The optical modulator 345 uses these electrical uplink channels to modulate a wavelength from the frequency conversion circuit 355 into corresponding upstream or uplink sub-channels 210B1-4 as is known, for example using sub-carrier modulation (SCM) or Time Division Multiplexing (TDM). These upstream sub-channels 210B1-4 are carried on the upstream wavelength 205B via the first optical circulator 310 onto the optical fibre 120F towards the OLT 105.

The optical-to-electrical interface 335 comprises a number of photo diodes each corresponding to a respective up link subscriber equipment channel and having a sensitive bandwidth that is lower than the frequency separation between the up link subscriber channels. The optical-to-electrical interface 335 can be standard off-the-shelf equipment as would be appreciated by those skilled in the art. The photodiodes are selected to have their centre frequencies aligned with the centre frequencies of the respective uplink subscriber channels.

In order to avoid the use of expensive lasers inside the ONT, the optical downlink wavelength 255B is tapped after amplification by the optical amplifier 315. This optical carrier signal (the downstream wavelength) is cleaned by the carrier recovery circuit 350 remove the sub-channels and frequency converted using the RF local oscillator 360 by the frequency conversion circuit 355. This process generates the upstream wavelength 205B which is then modulated with sub carriers by the optical modulator 345. Alternatively, a sperate uplink wavelength generating laser may be used.

Figure 4:
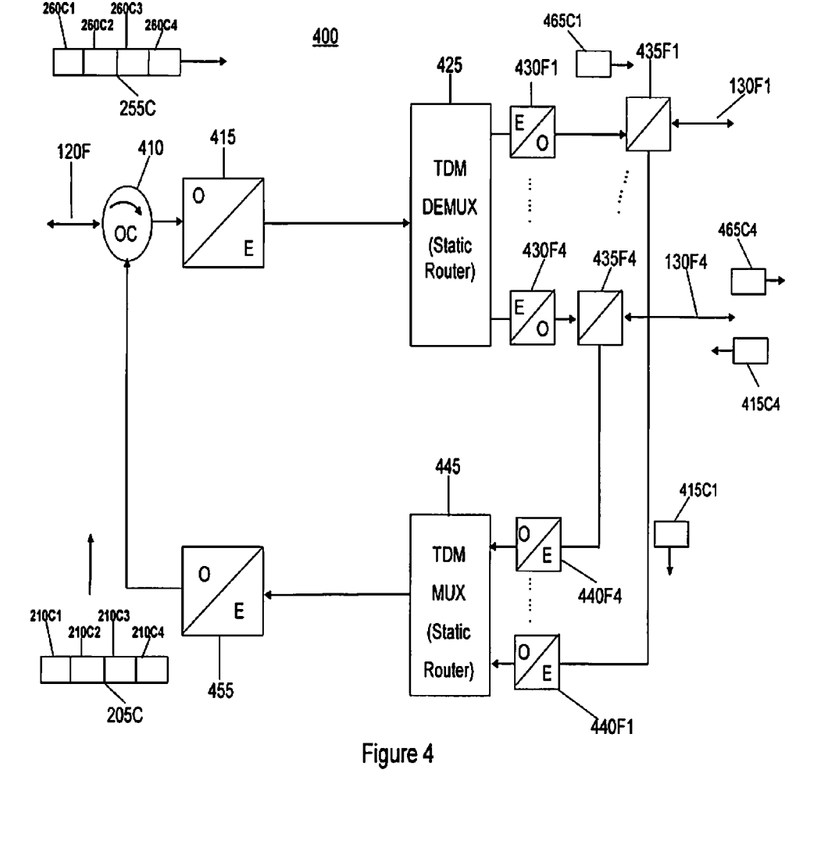
FIG. 4 shows an Optical Network Terminal according to another embodiment.

FIG. 4 illustrates an ONT 400 according to an alternative embodiment and comprises an optical circulator 410 connected to an optical fibre 120F from the OLT 105 and a downstream optical-to-electrical interface 415; this interface 415 is coupled to a TDM demultiplexer 425 which has outputs to a number of downstream electrical-to-optical interfaces 430F1-4; these interfaces 430F1-4 are coupled to respective wavelength splitters 435F1-4 which in turn are coupled to optical fibres 130F1-4 to respective subscriber equipment and also to upstream optical-to-electrical interfaces 440F1-4; these interfaces 440F1-4 are coupled to respective inputs of a TDM multiplexer 445 which has an output to an upstream electrical-to-optical interface 455 coupled to the first optical circulator 410.

The ONT 400 receives a down link wavelength 255C carrying TDM sub-channels 260C1-4 which are demultiplexed by the demultiplexer 425. These demultiplexed channels are converted into the optical domain by the downstream electrical-to-optical interfaces 430F1-4 to form the downstream subscriber equipment channels 270B1-4 respectively. Thus the TDM demultiplexer 425 forms a static router which automatically maps downstream sub-channels to respective downstream subscriber equipment channels without using an address associated with the subscriber equipment to which the downstream subscriber equipment channels are transmitted. Thus a 10 G/s TDM signal or frame 255C can be processed to obtain 4×2.5 G/s signals sent to different subscriber equipment. The inverse process is performed on the upstream subscriber equipment channels, the WDM splitters 435F1-4 being used to split the downstream and upstream subscriber equipment channels. Thus 4×2.5 G/s upstream subscriber equipment channels can be converted into 1×10 G/s upstream wavelength 205C including sub-channels 210C1-4 having been automatically mapped from respective upstream subscriber equipment channels 415C1-4. Because the mapping by the TDM multiplexer is static, addresses associated with the subscriber equipment are not needed to map these upstream subscriber equipment channels onto the respective sub-channels of the upstream wavelength 205C.

In a practical example, where 40 ONT 215F are employed in a PON 100, each ONT being coupled to 10 subscriber equipment 135F1, and with upstream and downstream wavelengths operating at 10 G/s, 1 G/s capacity can be provided to 400 subscribers which is far beyond the performance of known PON or WDM PON. And this is achieved using simple and cost effective static routing or mapping in the ONTs.

Figure 5:
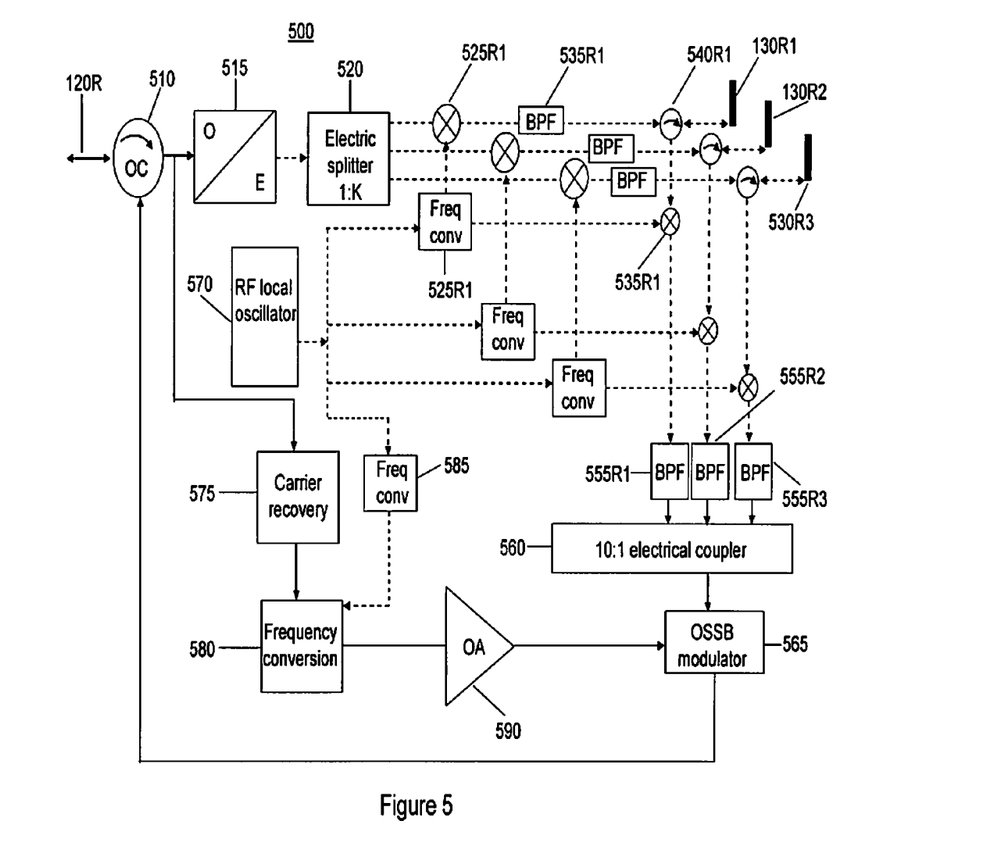
FIG. 5 shows an Optical Network Terminal according to a yet further embodiment.

FIG. 5 shows an ONT 500 according to a further alternative embodiment. The ONT 500 comprises an optical circulator 510 coupled to an optical fibre 120R to the OLT, and is also coupled to a downstream optical-to-electrical interface 515, which in turn is coupled to an electrical splitter 520. The electrical splitter 520 is simply a power splitter such that the downstream signal is split onto a number of output channels each comprising a mixer 525R1, a band pass filter 535R1, a duplexer 540R1 and an antenna 530R1-3. The mixer receives a radio frequency signal from a frequency converter 525R1 supplied by a radio frequency local oscillator 570 in order to generate radio links 130R1-3 on different frequencies. A second mixer 535R1 is used to receive signals on the radio link, these are band pass filtered using respective band pass filters 555R1-3. The signals transmitted from the antennas 535R1 to respective subscriber equipment 315R1-4 form the down link subscriber equipment channels. The up link subscriber equipment channels received by these antennas are combined at electrical coupler 560 to form an SCM or TDM multiplexed signal for conversion into the optical domain as the upstream sub-channels. The electrical-to-optical conversion is performed by an OSSB (optical single sideband) modulator 565 coupled to the optical circulator 510. As with the OTN of FIG. 3, the OSSB modulator 565 receives a carrier for the upstream wavelength using the downstream wavelength tapped into a carrier recovery circuit 575 which is converted to the upstream wavelength using a frequency conversion circuit 580 and an optical amplifier 590.

For simplicity of explanation; only some of the components of the ONT have been labeled, however the skilled person will appreciate for example that each subscriber equipment channel will include two mixers, two band pass filters, a frequency converter.

An ONT which utilises copper cable 130C1-4 to the subscriber equipment would have an analogous architecture to the ONT of FIG. 5, but utilising suitable copper cable modems at the ONT and subscriber equipment as would be understood by those skilled in the art. In such an ONT 125C utilising copper cable 130C1-4 to the subscriber equipment, and the ONT 125R of FIG. 5, the mapping between upstream subscriber equipment channels and upstream sub-channels is static. Typically the mapping between downstream sub-channels and downstream subscriber equipment channels is also static.

Figure 6:
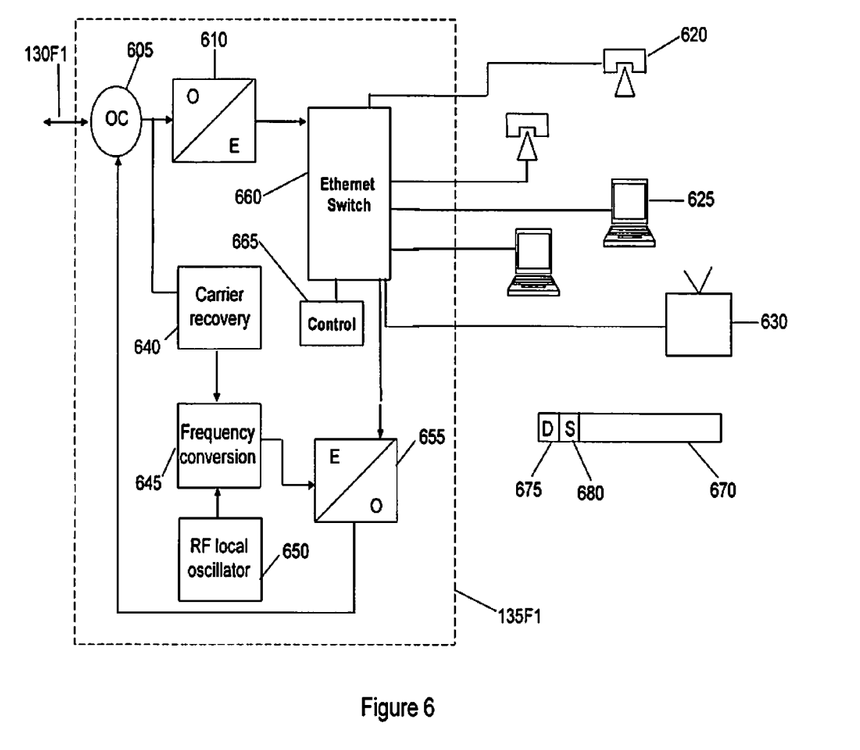
FIG. 6 shows a subscriber equipment according to an embodiment.

FIG. 6 illustrates subscriber equipment 135F1 in more detail. The subscriber equipment comprises an optical circulator 605 connected to an optical fibre 130F1 coupled to the ONT 125F. The subscriber equipment also comprises an optical-to-electrical interface 610 coupled to an Ethernet switch 660. The Ethernet switch 660 is coupled to an internal control block 665, an electrical-to-optical interface 655, and to a number of communications appliances such as telephones 620, computers 625 and television 630. The optical-to-electrical interface 610 receives a carrier signal 256B from the ONT 125F which is modulated with the downlink subscriber equipment channels 270B1-4. The electrical-to-optical interface 655 receives a carrier signal derived from the downstream subscriber equipment channel or channels (265B and 270B1-4), and which is modulated by signals received from the Ethernet switch 660 to generate the upstream subscriber equipment channel. A carrier recovery circuit 640, frequency conversion circuit 645, and RF local oscillator 650 are utilised to generate the upstream carrier or wavelength in a similar manner to that described above with respect to the ONT.

As will be appreciate by those skilled in the art, the Ethernet switch 660 inspects received packets and forwards them towards their destination. A packet 670 is shown which includes a destination address 675 and a source or sender address 680. The addresses of the various communications appliances 620-630 are associated with the subscriber equipment in the sense that they are directly connected to the subscriber equipment 135F1. The communications appliances can be directly forwarded packets 670 addressed to them from the subscriber equipment, and the subscriber equipment can directly receive packets 670 from the communications appliances. Packets from the telephone 620 which are not addressed to other communications appliances associated with the subscriber equipment 135F1 are directed to the electrical-to-optical interface 655 for transmission on the upstream subscriber equipment channel. The control block 655 may be utilised for controlling the subscriber equipment, monitoring the quality of the downstream and upstream subscriber equipment channels, installing communications appliances and other operations and maintenance functions as would be appreciated by those skilled in the art.

Note that the subscriber equipment does utilise an address associated with the subscriber equipment, for example the sender address 680 of the telephone 620, in order to map this signal or channel onto the upstream subscriber equipment channel. This compares with the static mapping of the ONT as previously described, and which do not use an address associated with the respective subscriber equipment.

Figure 7:
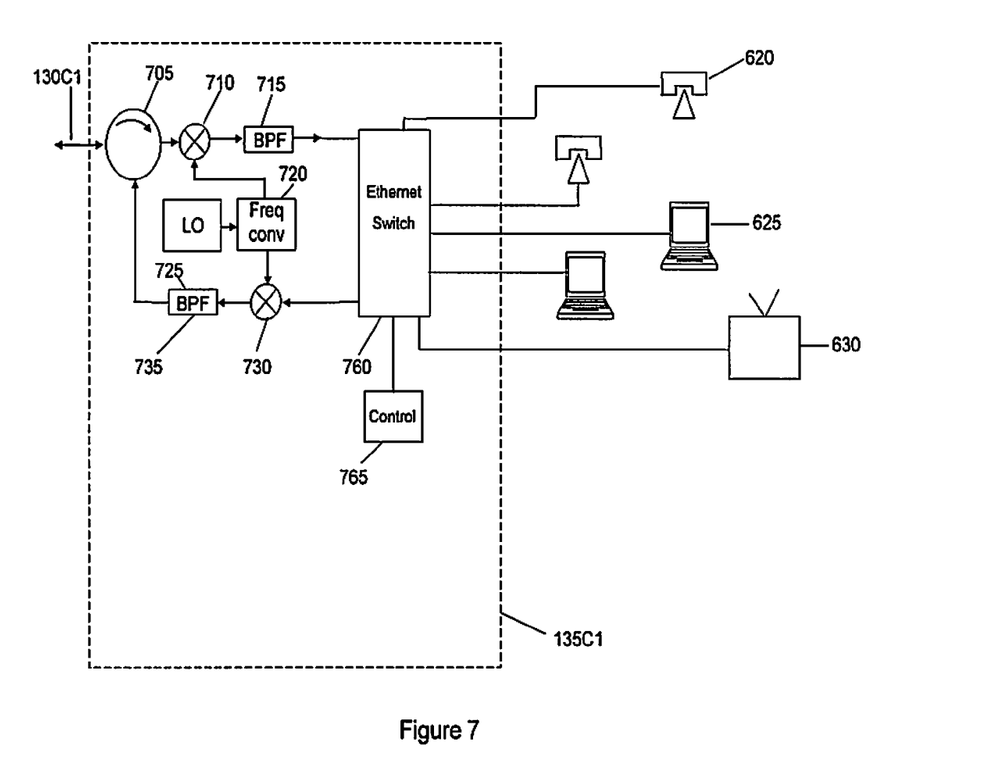
FIG. 7 shows a subscriber equipment according to another embodiment.

FIG. 7 shows subscriber equipment 135C1 according to another embodiment. The subscriber equipment is coupled to the ONT using copper cable 130C1 which is connected to an RF duplexer 705 for separating the upstream and downstream subscriber equipment channels. The duplexer 705 is coupled to a mixer 710 and a band pass filter 715 for receiving the downstream channel, and to a band pass filter 735 and another mixer 730 for generating the upstream subscriber equipment channels as would be appreciated by those skilled in the art. The mixers are supplied with carrier frequencies from a frequency conversion circuit 720 which receives an input from a local radio frequency oscillator 725. The receiving and transmitting channels are coupled to an Ethernet switch 760 which in turn is coupled to a number of communications appliances 620, 625, 630 and a control block 765 within the subscriber equipment 135C1. As with the subscriber equipment FIG. 6, the Ethernet switch 760 inspects received packets and forwards them onto their destination as would be appreciated by those skilled in the art.

A similar architecture can be used for a subscriber equipment coupled to an ONt by a radio link, with an antenna replacing the copper cable.

In the subscriber equipment of FIGS. 6 and 7, the upstream subscriber channel is not shared with other subscriber equipment such that the transceiver blocks or circuits of the subscriber equipment are not controlled to transmit during periods specified by the ONT.

In other words the subscriber equipment transmits the upstream subscriber equipment channel independently of the ONT, and typically this is transmitted continuously. The transceiver circuits include the optical circulator 605, interfaces 610 and 655, duplexer 707, mixer 710 and 750 and band pass filters 715 and 735.

Figure 8:
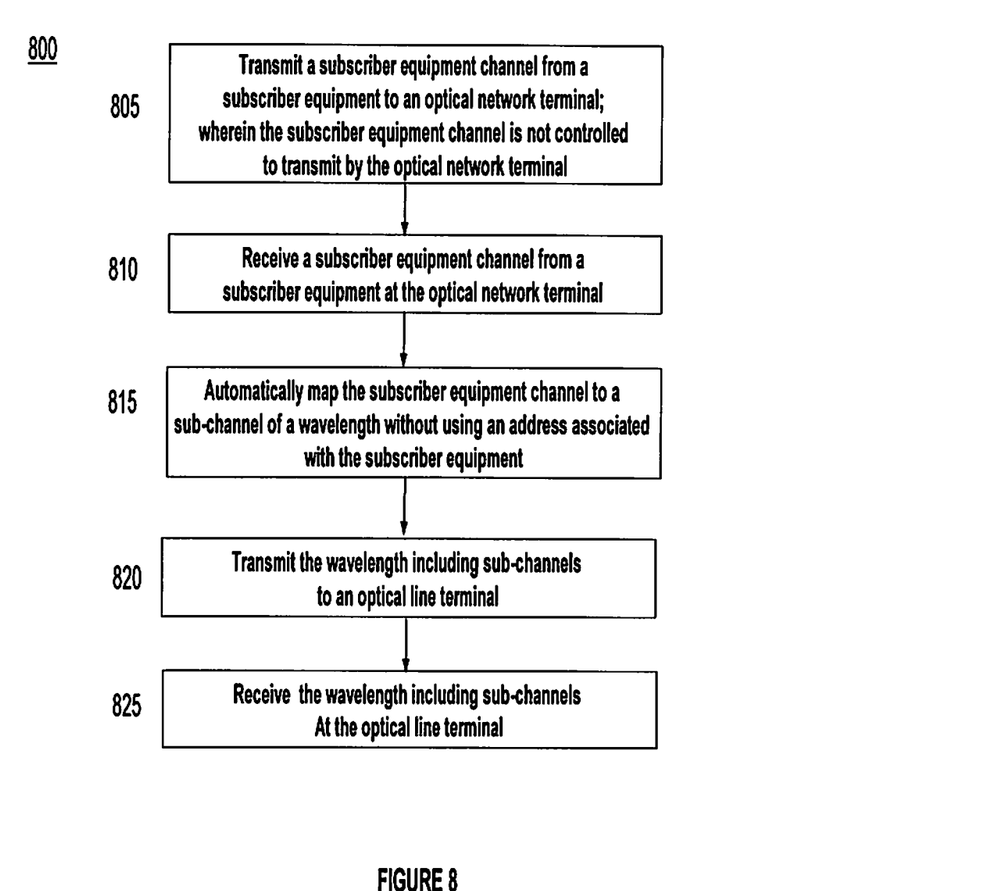
FIG. 8 shows a method of operating a PON in an upstream direction according to an embodiment.

FIG. 8 illustrates a method of operating a PON in the upstream direction. The subscriber equipment transmits a subscriber equipment channel to an optical network terminal at step 805. This subscriber equipment channel is not controlled to transmit by the optical network terminal as described above. The optical network terminal receives this upstream subscriber equipment channel from the subscriber equipment at step 810.

The optical network terminal automatically maps the upstream subscriber equipment channel to a sub-channel of an upstream wavelength at step 815. This automatic mapping is performed without using an address associated with the subscriber equipment. For example the mapping is static as previously described. The optical network terminal transmits the wavelength including sub-channel to an optical line terminal at step 820. The optical line terminal receives the wavelength including sub-channel.

Figure 9:
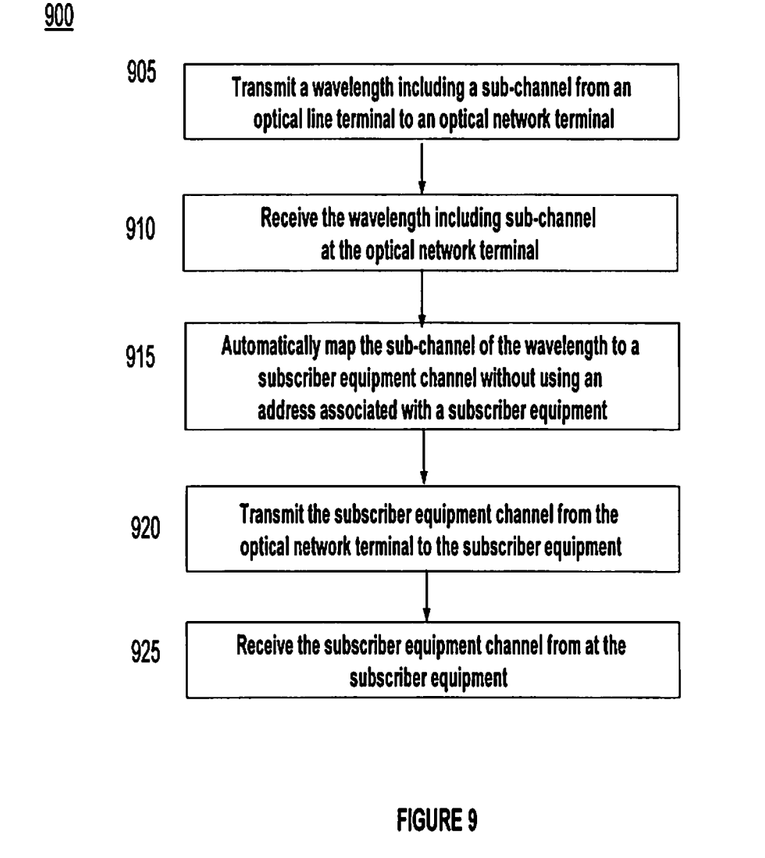
FIG. 9 shows a method of operating a PON in a downstream direction according to an embodiment.

A method of operating a PON in the downstream direction is shown in FIG. 9. The OLT transmits a wavelength including a sub-channel to an optical network terminal at step 905. The optical network terminal receives the wavelength including sub-channel at step 910. The optical network terminal automatically maps the sub-channel of the wavelength to a respective downstream subscriber equipment channel, without using an address associated with subscriber equipment, at step 915. The ONT transmits the downstream subscriber equipment channel to a respective subscriber equipment at step 920. The subscriber equipment receives the downstream subscriber equipment channel at step 925.

These and other methods here described may be implemented as computer code executed on a computer.

The skilled person will appreciate that various modifications could be made to the described embodiments without departing from the scope of the appended claims.

The invention claimed is:

1. An optical network terminal (ONT) for use in an optical access network, the optical network terminal comprising:
an optical transceiver arranged to communicate with an optical line terminal (OLT) using a downstream wavelength which is modulated to carry sub-channels; and
a second transceiver arranged to communicate with a number of subscriber equipment using respective subscriber equipment channels,
wherein the ONT is arranged to automatically map each downstream subscriber equipment channel to a respective sub-channel of the downstream wavelength without using an address associated with the respective subscriber equipment,
wherein the optical transceiver is arranged to use the downstream wavelength to generate an upstream wavelength that is modulated with upstream sub carriers of the subscriber equipment for communicating with the OLT, wherein the upstream wavelength is different from the downstream wavelength.

2. An ONT according to claim 1, wherein the ONT is arranged to statically map downstream subscriber equipment channels to respective sub-channels of the downstream wavelength.

3. An ONT according to claim 1, wherein:
each said subscriber equipment channel is an upstream subscriber equipment channel which is automatically mapped to a respective sub-channel of the upstream wavelength;
and
the second transceiver is further arranged to transmit a respective one of the downstream subscriber equipment channels to each respective subscriber equipment.

4. An ONT according to claim 3, wherein the ONT is arranged to broadcast each sub-channel of the downstream wavelength as the downstream subscriber equipment channels without using an address associated with the respective subscriber equipment.

5. An ONT according to claim 1, wherein the second transceiver is a second optical transceiver arranged to communicate with at least one of the subscriber equipment using optical signals.

6. An ONT according to claim 5, wherein the optical transceiver comprises an optical modulator coupled to an optical circulator, upstream sub-channels of the upstream wavelength are generated by the optical modulator controlled by an electronic multiplexer arranged to receive the upstream subscriber equipment channels, and the second optical transceiver comprises an optical splitter optically coupled to the optical circulator.

7. An ONT according to claim 1, wherein the second transceiver is a radio or a cable transceiver arranged to communicate with at least one of the subscriber equipment using radio or cable signals.

8. An ONT according to claim 1, wherein the sub-channels are implemented with sub-carrier multiplexed (SCM) or time division multiplexed (TDM) channels.

9. An ONT according to claim 1, wherein the ONT is implemented in a passive optical network (PON).

10. An optical access network comprising:
an optical line terminal (OLT) coupled to an optical network terminal (ONT) arranged to communicate with the optical line terminal using a downstream wavelength, wherein the optical network terminal is arranged to be coupled to a number of subscriber terminals,
wherein the optical line terminal is arranged to modulate the downstream wavelength to carry a plurality of sub-channels;
wherein the optical network terminal is arranged to communicate with the subscriber terminals using respective subscriber channels; and
wherein the ONT is further arranged to automatically map each downstream subscriber equipment channel to a respective sub-channel of the downstream wavelength without using an address associated with the respective subscriber equipment,
wherein:
an upstream subscriber equipment channel which is automatically mapped to the respective sub-channel of an upstream wavelength;
and
the second transceiver is further arranged to transmit a respective one of the downstream subscriber equipment channels to each respective subscriber equipment; and the optical transceiver is arranged to use the downstream wavelength to generate an upstream wavelength that is modulated with upstream sub carriers of the subscriber equipment for communicating with the OLT, wherein the upstream wavelength is different from the downstream wavelength.

11. An optical access network according to claim 10, wherein the ONT is arranged to statically map downstream subscriber equipment channels to respective sub-channels of the downstream wavelength.

12. An optical access network according to claim 10, further comprising a wavelength splitter coupled to the OLT by an optical fibre, the wavelength splitter also coupled to a number of said optical network terminals by respective optical fibres.

13. An optical access network according to claim 10, wherein the sub-channels are provided using sub-carrier multiplexing (SCM) or time division multiplexing (TDM) of the respective wavelength.

14. An optical access network according to claim 10, wherein the ONT is coupled to the subscriber terminals by respective radio channels or copper cables.

15. An optical access network according to claim 10, wherein the ONT is coupled to the subscriber terminals by respective optical fibres, the subscriber terminals being secondary ONTs.

16. An optical access network according to claim 10, wherein the ONT is arranged to broadcast each sub-channel of the downstream wavelength as the downstream subscriber equipment channels without using an address associated with the respective subscriber equipment.

17. An optical access network according to claim 10, wherein the optical transceiver is arranged to electronically multiplex the upstream subscriber channels to generate the upstream wavelength and sub-channels, and to optically split the downstream wavelength and sub-channels to the downstream subscriber channels.

18. An optical access network comprising:
an optical line terminal coupled to a wavelength splitter by an optical fibre;
the wavelength splitter coupled to a number of primary optical network terminals by respective optical fibres, each primary optical network terminal arranged to communicate with the optical line terminal using a respective downstream wavelength;
said primary optical network terminal arranged to be coupled to a plurality of secondary optical network terminals by respective optical fibres;
wherein the optical line terminal is arranged to modulate the respective downstream wavelength to carry a plurality of sub-channels, the optical line terminal arranged to communicate with each of the plurality of secondary optical network terminals using a respective sub-channel,
wherein the primary optical network terminal is arranged to use the respective downstream wavelength to generate a respective upstream wavelength that is modulated with upstream sub carriers of the subscriber equipment for communicating with the optical line terminal, wherein the respective upstream wavelength is different from the respective downstream wavelength.

19. An optical access network according to claim 18, wherein the ONT is further arranged to automatically map a secondary optical networks channel to a respective sub-channel of the downstream wavelength without using an address associated with the respective secondary optical network terminal.

20. A method of operating an optical network terminal in an optical access network, the method comprising:
- receiving a subscriber equipment channel from a subscriber equipment;
- automatically mapping the subscriber equipment channels to a respective sub-channel of a wavelength without using an address associated with the respective subscriber equipment;
- transmitting the wavelength to an optical line terminal; and
- generating the wavelength from a downstream wavelength that the optical network terminal uses to communicate with the optical line terminal, wherein the wavelength is different from the downstream wavelength.

21. A method according to claim 20, wherein automatically mapping the subscriber equipment channels to a respective sub-channel of a wavelength without using an address associated with the respective subscriber equipment comprises statically mapping the subscriber equipment channels to a respective sub-channel of a wavelength.

22. A method of communicating in an optical access network, the method comprising:
- transmitting a subscriber equipment channel from a respective subscriber equipment to an optical network terminal;
- receiving the subscriber equipment channel at the optical network terminal;
- automatically mapping the subscriber equipment channel to a respective subchannel of a wavelength without using an address associated with the respective subscriber equipment;
- transmitting the wavelength with sub-channel from the optical network terminal to an optical line terminal; and
- generating the wavelength from a downstream wavelength that the optical network terminal uses to communicate with the optical line terminal, wherein the wavelength is different from the downstream wavelength.

\* \* \* \* \*

UNITED STATES PATENT AND TRADEMARK OFFICE
CERTIFICATE OF CORRECTION

Page 1 of 1

PATENT NO. : 8,666,250 B2
APPLICATION NO. : 12/921370
DATED : March 4, 2014
INVENTOR(S) : Ghiggino et al.

It is certified that error appears in the above-identified patent and that said Letters Patent is hereby corrected as shown below:

In the Specification

In Column 3, Line 12, delete "120E-120C." and insert -- 120F-120C. --, therefor.

In Column 3, Line 47, delete "WMD splitter 115 onto respective fibre 120E-C" and insert -- WDM splitter 115 onto respective fibre 120F-C --, therefor.

In Column 5, Line 41, delete "sperate" and insert -- separate --, therefor.

In Column 6, Line 44, delete "OTN" and insert -- ONT --, therefor.

In Column 8, Line 2, delete "ONt" and insert -- ONT --, therefor.

In the Claims

In Column 9, Line 13, in Claim 2, delete "and" and insert the same at line 12 after "wavelength;", as a continuation subpoint.

In Column 9, Line 61, in Claim 10, delete "channel which is" and insert -- channel is --, therefor.

In Column 9, Line 64, in Claim 10, delete "and" and insert the same at line 63 after "wavelength;", as a continuation subpoint.

Signed and Sealed this
Twenty-eighth Day of July, 2015

Michelle K. Lee
*Director of the United States Patent and Trademark Office*